(12) United States Patent  
Goldberg et al.

(10) Patent No.: US 8,948,353 B2  
(45) Date of Patent: Feb. 3, 2015

(54) CALL CONNECTION SYSTEM AND METHOD

(75) Inventors: Itzhack Goldberg, Hadera (IL); Samuel Kallner, Menashe (IL); Yotam Medini, Binyamina (IL); Kenneth Nagin, Hamovil (IL)

(73) Assignee: International Business Machines Corporation, Armonk, NY (US)

( * ) Notice: Subject to any disclaimer, the term of this patent is extended or adjusted under 35 U.S.C. 154(b) by 2070 days.

(21) Appl. No.: 11/761,383

(22) Filed: Jun. 12, 2007

(65) Prior Publication Data

US 2008/0310605 A1 Dec. 18, 2008

(51) Int. Cl.
*H04M 11/00* (2006.01)
*H04M 1/2745* (2006.01)

(52) U.S. Cl.
CPC .............................. *H04M 1/274516* (2013.01)
USPC .................. 379/93.01; 379/93.18; 379/93.23; 379/142.01

(58) Field of Classification Search
USPC ........ 379/93.01, 93.04, 93.18, 93.23, 142.01, 379/142.05
See application file for complete search history.

(56) References Cited

U.S. PATENT DOCUMENTS

| 4,903,289 | A | 2/1990 | Hashimoto |
| 5,825,873 | A | 10/1998 | Duncan et al. |
| 6,018,570 | A | 1/2000 | Matison |
| 6,128,514 | A | 10/2000 | Griffith et al. |
| 6,208,725 | B1 | 3/2001 | Davies |
| 6,301,339 | B1 * | 10/2001 | Staples et al. ............... 379/93.01 |
| 6,314,179 | B1 | 11/2001 | Chen |
| 6,330,539 | B1 | 12/2001 | Takayama et al. |
| 6,701,145 | B2 | 3/2004 | Payne et al. |
| 6,788,772 | B2 | 9/2004 | Barak et al. |
| 2006/0177016 | A1 | 8/2006 | Gallick et al. |
| 2007/0112964 | A1 * | 5/2007 | Guedalia et al. ............... 709/227 |

* cited by examiner

*Primary Examiner* — Duc Nguyen
*Assistant Examiner* — Yosef K Laekemariam
(74) *Attorney, Agent, or Firm* — William H. Hartwell; Trentice Bolar

(57) ABSTRACT

A method for establishing a communication connection between a first communication device and a second communication device, the method comprising requesting contact information for a second communication device, during a first communication connection established between a first communication device and a third communication device; receiving the contact information from the third communication device, in response to a third party interacting with the third communication device during the first communication connection; and establishing a second communication connection between the first communication device and the second communication device based on the contact information received from the third communication device, wherein the second communication connection is established by way of the first communication device independently initiating communication with the second communication device.

20 Claims, 5 Drawing Sheets

CALL CONNECTION SYSTEM AND METHOD

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to communication systems and, more particularly, to a system and method for connecting a call between two parties based on information provided by a third party.

BACKGROUND

Occasionally, a first person wants to call a second person, but the first person may not have the telephone number of the second person. The first person may then call a third person to obtain the second person's contact number. The third person usually provides the contact information to the first person verbally.

The first person will then have to either memorize the number or write it down. After the first person disconnects the phone with the third person, the first person will dial the phone number of the second person. The above process is inconvenient and especially burdensome when the first person is driving a vehicle or does not have access to pen and paper to write down the phone number of the second party.

Certain telephony systems, such as a Private Branch eXchange (PBX), provide a telephone exchange in which telephone units that are members of the telephone exchange can be connected by way of a call transfer protocol. Call transfer protocols in such systems are divided into the following two categories: consult transfer and blind transfer.

In a consult transfer, a third person (transferor) receives a call from a first person (transferee) who wants to contact a second person (transferto). To consult transfer a caller, the third person consults with the second person before transferring the call, by pressing a transfer button to place the first parson on hold. The third person then directly dials the phone number of the second person and waits until the second person answers the call. The third person then informs the second person that he is transferring the call. The transfer can be completed when the third person presses the transfer button again.

A blind transfer is similar to the consult transfer process in that the third person acts as an intermediary in order for the call to be established. In blind transfer, however, the third person can transfer the first person to the second person without consulting the second person by placing the first person on hold, dialing the second person's number, pressing transfer and hanging up.

In the above scenarios, the first party is transferred to the second party through a gateway that connects the calls using the framework and resources of a private telephone exchange in which the third party is a member. That is, without the gateways and special programming to support the call transfer, the third party's telephone unit will not be able to transfer the call.

As such, the first person will not be able to contact the second person, if the third person's telephone unit does not support call transfer capability. Even further, the first person will have to solely rely on the third person to complete the call transfer successfully. That is, if the communication between the first person and the second person is interrupted, the call transfer may not be successful.

Furthermore, the above-noted call transfer method will apply a service charge to the third person's phone line for dialing the second person's phone number and transferring the call. So if the third person does not want to incur this cost, the first person will have to compensate the third person later, or be indebted. In short, the first person is unable to establish a direct connection with the second person via the currently available private telephone exchange protocols.

Accordingly, the requirements and limitations associated with the current private telephone network for contacting a second person are cumbersome and inconvenient to a user who wishes to directly contact the second person. Thus, methods and systems are needed that can overcome the aforementioned shortcomings.

SUMMARY

The present disclosure is directed to a system and corresponding methods that facilitate connecting a call between two parties based on information provided by a third party.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for connecting a call between two parties based on information provided by a third party is provided. The method comprises requesting contact information for a second communication device, during a first communication connection established between a first communication device and a third communication device; receiving the contact information from the third communication device, in response to a third party interacting with the third communication device during the first communication connection; and establishing a second communication connection between the first communication device and the second communication device based on the contact information received from the third communication device.

Preferably, the second communication connection is established by way of the first communication device initiating communication with the second communication device. In one embodiment, the contact information is communicated from the third device to the first device by way of a message sent from the third device to the first device, wherein the message comprises coded data decodable by the first communication device, the coded data indicating that the message includes the contact information.

In accordance with one aspect of the invention, a system for connecting a call between two parties based on information provided by a third party is provided. The system comprises a logic unit for requesting contact information for a second communication device, during a first communication connection established between a first communication device and a third communication device; a logic unit for receiving the contact information from the third communication device, in response to a third party interacting with the third communication device during the first communication connection; and a logic unit for establishing a second communication connection between the first communication device and the second communication device based on the contact information received from the third communication device, wherein the second communication connection is established by way of the first communication device independently initiating communication with the second communication device.

In another embodiment, a computer program product comprising a computer useable medium having a computer readable program is provided. The computer readable program when executed on a computer causes the computer to perform the operations disclosed with reference to the above methods and systems.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate connecting a call between two parties based on information provided by a third party. The first party contacts a third party to receive contact information for the second party. The third party transfers the contact information to a communication unit used by the first party. The first party independent from the third contacts the second party using the provided contact information.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
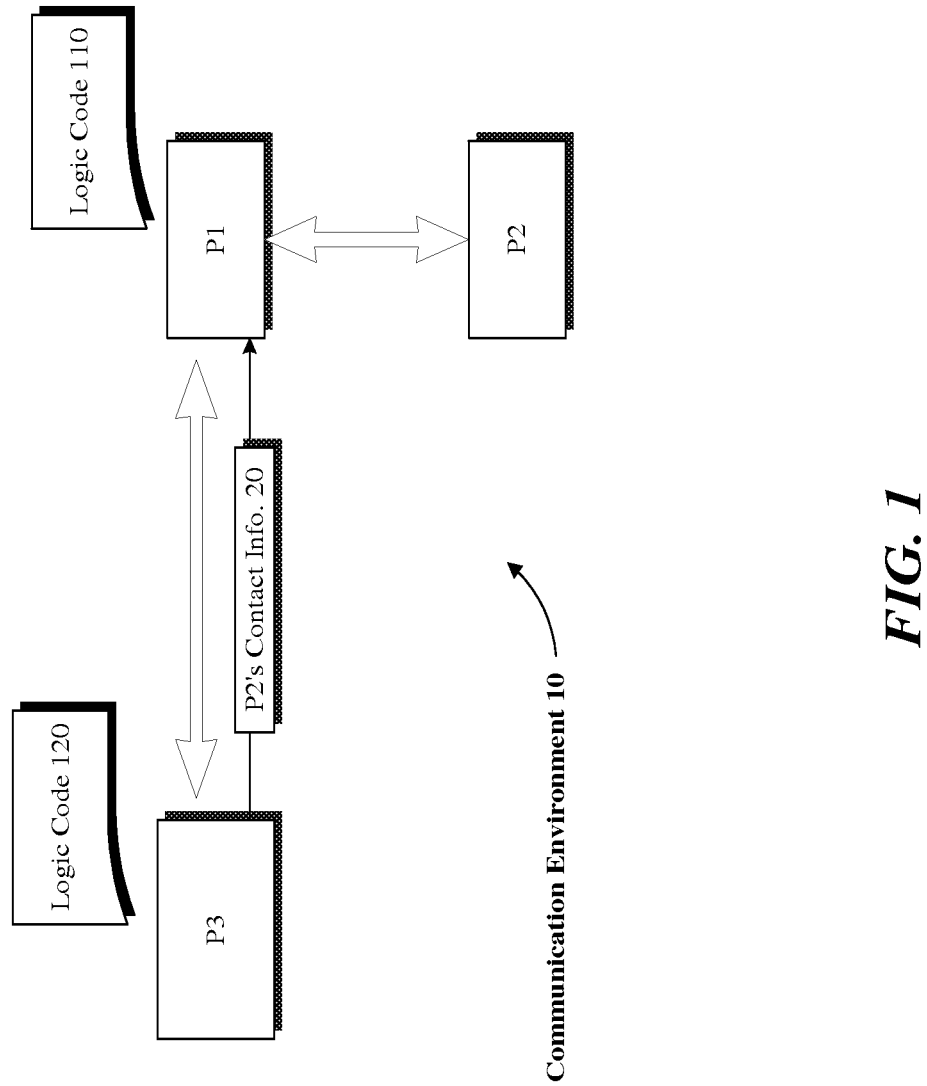
FIG. 1 illustrates an exemplary communication environment in accordance with one or more embodiments of the invention, wherein a call between two parties is connected based on information provided by a third party.

Referring to FIG. 1, an exemplary communication environment is illustrated, wherein logic codes 110 and 120 are respectively executed on communication units P1 and P3. In accordance with one embodiment, P1 is used by a first person who wishes to contact a second person using a communication unit P2. A third person using P3 may be contacted by the first person using P1, for example, when the first person does not have the contact information for the second person.

In accordance with one embodiment, P1, P2 and P3 are telephone units, for example. It is noteworthy that P1, P2 and P3 can be any type of communication device or computing system in accordance with other embodiments. A communication connection between P1, P2 and P3 may be established over a circuit-switched telephone network, such as the public switched telephone network (PSTN), a public IP-based packet-switched network (e.g., TCP/IP), such as the Internet, a radio telephony network, such as a cellular network or any combination of the above telephony networks that facilitate the communication of voice, audio, video, text or other types of data from a first destination to a second destination.

Preferably, P1, P2 and P3 communicated over a third generation (3G) cellular communication network which supports the TCP/IP protocol that allows the terminals to be always connected to, for example, a world wide web of remotely connected computing devices, or any local or wide area networks. These computing devices may be desktop or laptop computers or mobile (e.g., cellular) communication units coupled to a common backend server, or alternatively connected in a peer-to-peer communication environment.

Figure 2:
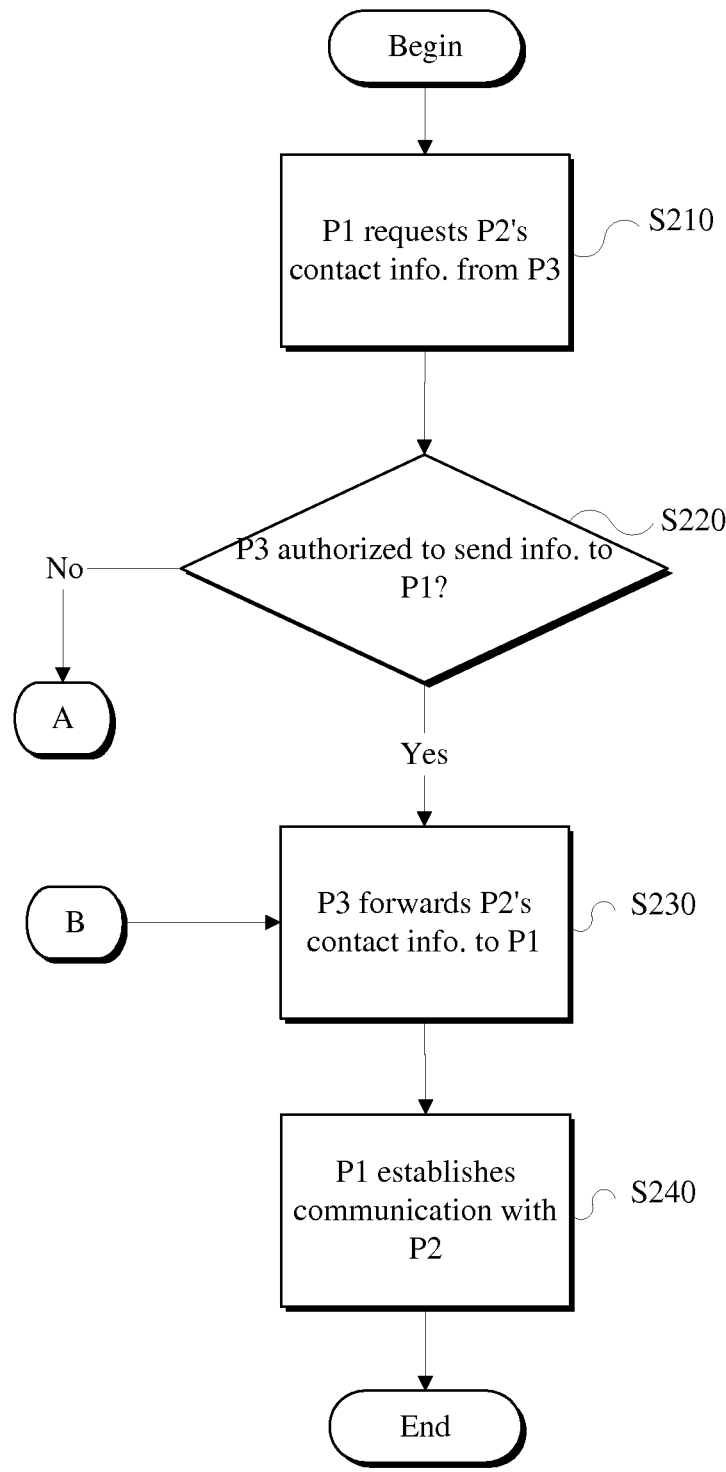
FIGS. 2 and 3 are flow diagrams of a method for connecting a call between two parties based on information provided by a third party, in accordance with one embodiment.

Referring to FIG. 2, in accordance with one embodiment, once a communication connection is established between P1 and P3, P1 requests P2's contact information from P3 (S210). The request may be made either verbally or by way of a messaging system such as short messaging system (SMS) or other communication protocols available for transmitting information over the established communication connection between P1 and P3.

For example, P1 may send an SMS message to P3 with a request for information for P2's contact information. In response, P3 may reply to P1's request by including P2's contact information in an SMS message sent to P1. The SMS message, preferably, comprises an embedded header or an especially recognizable code (e.g., encoded prefix, postfix, etc.) which is used to indicate that the SMS message is a request or a reply within the above context, so that P1 and P3 can distinguish such messages from ordinary text messages and properly process the corresponding request or reply included therein.

In some embodiments, once the request is received by P3, it is determined whether P3 is authorized to send the requested information to P1 (S220). The determination can be made, depending on implementation, at the time the communication connection is established between P1 and P3, at the time the request is sent by P1 or received by P3, or at any time in between.

In certain embodiments, a computing system (e.g., a central server, not shown) independent from P1, P2 or P3 may act as an intermediary authorization point for verifying the relationship between the requesting and transmitting parties and whether the parties are authorized to provide information about another party. In some embodiments, user of P3 can identify certain information stored in P3 as private, sharable or public to provide different levels of access to different parties trying to access variety of data stored in P3.

For example, if P1 is designated as a fully trusted device, then P1 may have authorization to access all data stored on P3, including private, sharable or public data. If P1 is not trusted, it may have authorization to access information designated as public data. If P1 is trusted but is not a fully trusted device, then it may have authorization to access public and sharable data. Thus, depending on whether P2's contact information is designated as public, private or sharable, and depending on P1's trusted status, P1 may or may not be granted authorization to access or receive P2's contact information.

Figure 3:
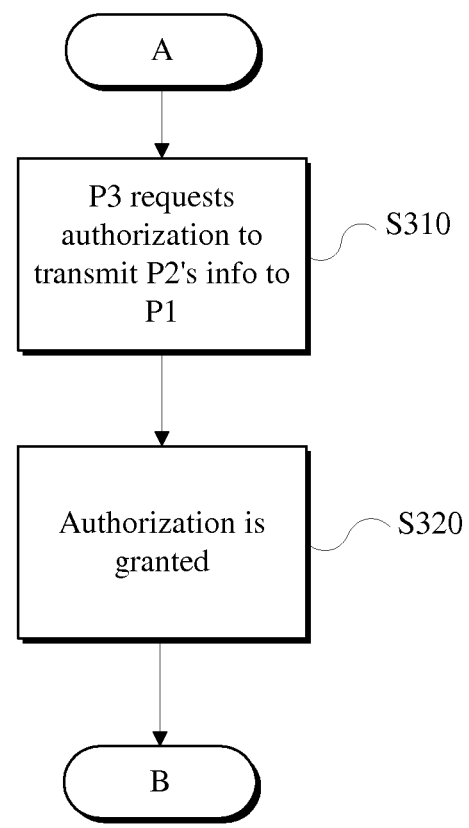

Referring to FIGS. 2 and 3, if P1 is not authorized to access the requested contact information or if P3 is not authorized to send the requested contact information for P2 to P1, then either P2 or P3 may request authorization to receive or transmit P2's information (S310). The request for authorization may be submitted by P2 to P3, or alternatively by P2 or P3 to a central server or any other entity that can provide such authorization. For example, the central server may be configured to store authorization information in a database that maintains the authorization relationships between various communicating parties.

Said exemplary central server may be implemented as a part of a communication backbone supported by a telephone company that routes the communication connection, or as a part of a server connected to a network that is used to route the communication connection. Once it is verified that P3 is authorized to send P2's contact information to P1, or that P1 is authorized to receive P2's information, then authorization is granted (S320), otherwise P3 would not be allowed to forward the requested contact information.

It is noteworthy that the aforementioned authorization scheme is optional in certain embodiments and not mandatory. The purpose of the authorization scheme is to prohibit transfer of contact information between unauthorized parties (e.g., between parties that are not subscribed to the respective service) or to provide some confidentiality restrictions for parties who do not wish to have their private contact information available to other parties without prior approval.

Referring back to FIG. 2, once the authorization is granted, logic code 120 running on P3, for example, forwards P2's contact information to P1 (S230). Depending on implementation, the contact information can be sent by way of a text message, for example, and preferably over the SMS protocol, as discussed earlier. It is noteworthy, however, that the information may be communicated over any suitable communication protocol (e.g., TCP/IP, HTTP, etc.) and in any format (e.g., multimedia object, audio, etc.).

In certain embodiments, logic code 110 running on P1 receives the contact information and stores the information in a database (e.g., database local to P1); so that P1 can use the information to independently contact P2. In other embodiments, P1 may retrieve the contact information from a central database that is, for example, remotely accessible by P1. Regardless, once P3 transmits P2's contact information, P1 will be able to use that information to establish a communication connection with P2 (S240).

In one embodiment, logic code 110 causes P1 to automatically establish a direct communication connection with P2 by, for example, dialing P2's telephone number, independent from any other action taken by P3 or a person using P1. Preferably, the connection between P1 and P2 is established, after the communication connection between P1 and P3 is disconnected. Accordingly, in certain embodiments, logic code 110 is configured to receive or retrieve P2's contact information, and after detecting the disconnection between P1 and P3, logic code 110 causes a direct connection to be automatically established between P1 and P2.

The direct connection can be automatically established by way of the following process. Logic code 120 sends P2's contact information, either by an SMS message or by means of another communication protocol to P1. When P1 receives the message sent by logic code 120, the message is passed to logic code 110 for processing. Logic code 110 then determines if P3 is authorized to cause P1 to automatically establish a connection to P2. If so, logic code 110 then causes a direct connection to be automatically established between P1 and P2.

The authorization process can be performed in several ways. In one embodiment, during the connection between P1 and P3, the user of P1 indicates to P1 that he will accept to receive certain information (e.g., P2's contact information) from P3. In another embodiment, P1 may place P3 on a pre-approved list of devices that are to be trusted by P1 for receiving certain information. In yet another embodiment, the authorization for transferring information between P1 and P3 may be verified by a server system coupled to the telephony network over which P1 and P3 communicate.

The above-noted direct connection between P1 and P3, in one embodiment, is a communication connection established between two endpoints in a communication network. The direct connection can be established over wired or wireless telephony lines supported by a PSTN, a radio network (e.g., cellular network), a data network (e.g., the Internet), another type of suitable communication network, or a combination of such networks that allow a first endpoint contact a second endpoint without having to go through a third connection endpoint.

A connection endpoint, in one embodiment, refers to a device that can be used to initiate or respond to a request for a communication connection. For example, in a voice call, the first endpoint may be a first telephone unit used to initiate the call, and the second endpoint may be a second telephone unit used to receive the call. Said first and second endpoints may communicate over a communication protocol that is supported by a backbone that comprises router systems and other intermediary communication devices configured to support and route the call between the two endpoints.

The call connection system and method disclosed above provides the following advantages over the currently deployed call transfer systems and methods: (1) It allows P3 to provide contact information for P2 to P1 without the risk of either P1 or P3 being identified by P2; (2) P2's contact information can be stored in P1, after the information is forwarded from P3 to P1; and (3) P2's contact information will be recorded in a call log of P1, after P1 contact P2.

In different embodiments, the invention can be implemented either entirely in the form of hardware or entirely in the form of software, or a combination of both hardware and software elements. For example, communication devices P1, P2 and P3 and logic codes 110 and 120 may comprise a controlled computing system environment that can be presented largely in terms of hardware components and software code executed to perform processes that achieve the results contemplated by the system of the present invention.

Figure 4A:
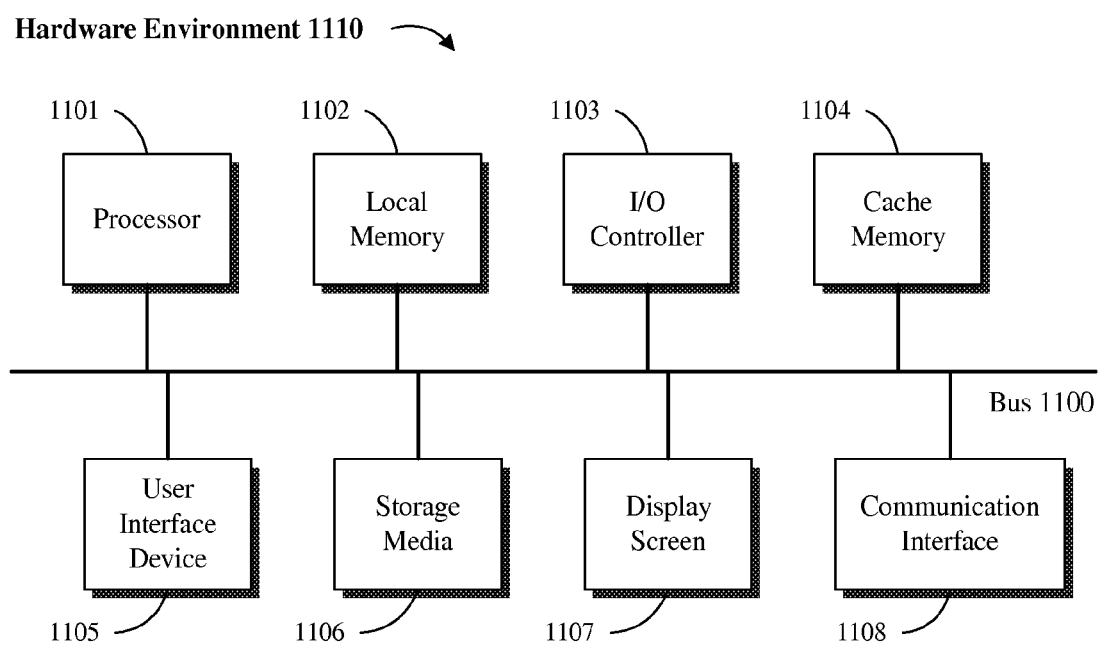
FIGS. 4A and 4B are block diagrams of hardware and software environments in which a system of the present invention may operate, in accordance with one or more embodiments.
Figure 4B:
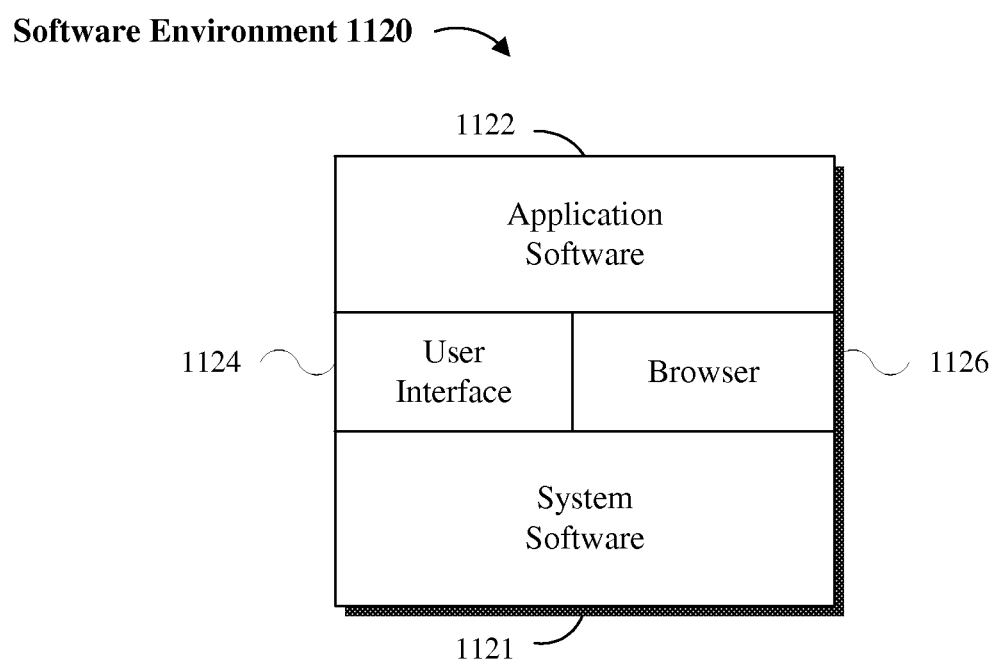

Referring to FIGS. 4A and 4B, a computing system environment in accordance with an exemplary embodiment is composed of a hardware environment 1110 and a software environment 1120. The hardware environment 1110 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two major classes comprising system software 1121 and application software 1122. System software 1121 comprises control programs, such as the operating system (OS) and information management systems that instruct the hardware how to function and process information.

In a preferred embodiment, either of the logic codes 110 or 120 is implemented as application software 1122 executed on one or more hardware environments (e.g., P1, P2, P3) to facilitate the establishment of a communication connection between one or more endpoints in a communication network. Application software 1122 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4A, an embodiment of the application software 1122 can be implemented as computer software in the form of computer readable code executed on a data processing system such as hardware environment 1110 that comprises a processor 1101 coupled to one or more memory elements by way of a system bus 1100. The memory elements, for example, can comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4B, application software 1122 can comprise one or more computer programs that are executed on top of system software 1121 after being loaded from storage media 1106 into local memory 1102. In a client-server architecture, application software 1122 may comprise client software and server software. For example, in one embodiment of the invention, client software is executed on computing system 100 and server software is executed on a server system (not shown).

Software environment 1120 may also comprise browser software 1126 for accessing data available over local or remote computing networks. Further, software environment 1120 may comprise a user interface 1124 (e.g., a Graphical Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further by the claims and their full scope of equivalents.

What is claimed is:

1. A machine-implemented method for establishing a communication connection between a first communication device and a second communication device, the method comprising:

requesting contact information for a second communication device, during a first communication connection established between a first communication device and a third communication device, wherein the request for contact information is submitted in form of a communication message with embedded code to indicate to the third communication device that the first communication device is requesting contact information for the second communication device;

receiving the contact information from the third communication device and automatically storing the contact information in the first communication device; and establishing a second communication connection between the first communication device and the second communication device based on the contact information received from the third communication device, wherein the second communication connection is established by way of the first communication device independently initiating communication with the second communication device without any intermediary connection activity performed by the third communication device, and wherein the contact information is communicated from the third communication device to the first communication device by way of a message sent from the third communication device to the first communication device.

2. The method of claim 1, wherein the contact information comprises a telephone number for the second communication device.

3. The method of claim 1, wherein the contact information is transferred from the third communication device to the first communication device over short messaging protocol (SMS).

4. The method of claim 1, wherein the contact information is transferred from the third communication device to the first communication device over a text-based communication protocol.

5. The method of claim 1, wherein the third communication device transfers the contact information to the first communication device, in response to determining that transferring the contact information to the first communication device is authorized.

6. The method of claim 5, wherein the authorization for transferring the contact information is provided based on a profile associated with the first communication device.

7. The method of claim 5, wherein the authorization for transferring the contact information is provided based on a profile associated with the second communication device.

8. The method of claim 5, wherein the authorization for transferring the contact information is provided based on a profile available to a network server monitoring the first communication connection.

9. The method of claim 1, wherein the second communication connection is directly established between the first and second communication devices, independent from any connections established between the first communication device and the third communication device.

10. The method of claim 9, wherein the first and second communication devices are both endpoints for the second communication connection.

11. A system comprising one or more processors utilized for establishing a communication connection between a first communication device and a second communication device, the system comprising:

a logic unit for requesting contact information for a second communication device, during a first communication connection established between a first communication device and a third communication device, wherein the request for contact information is submitted in form of a communication message with embedded code to indicate to the third communication device that the first communication device is requesting contact information for the second communication device;

a logic unit for receiving the contact information from the third communication device; and a logic unit for automatically establishing a second communication connection between the first communication device and the second communication device based on the contact information received from the third communication device, wherein the second communication connection is established by way of the first communication device independently initiating communication with the second communication device, without any intermediary connection activity performed by the third communication device, and wherein the contact information is communicated from the third communication device to the first communication device by way of a message sent from the third communication device to the first communication device.

12. The system of claim 11, wherein the contact information comprises a telephone number for the second communication device.

13. The method of claim 11, wherein the contact information is transferred from the third communication device to the first communication device over short messaging protocol (SMS).

14. The method of claim 11, wherein the contact information is transferred from the third communication device to the first communication device over a text-based communication protocol.

15. The method of claim 11, wherein the third communication device transfers the contact information to the first communication device, in response to determining that transferring the contact information to the first communication device is authorized.

16. A computer program product comprising a non-transitory computer useable data storage medium having a computer readable program, wherein the computer readable program when executed on a computer causes the computer to:

request contact information for a second communication device, during a first communication connection established between a first communication device and a third communication device, wherein the request for contact information is submitted in form of a communication message with embedded code to indicate to the third communication device that the first communication device is requesting contact information for the second communication device;

receive the contact information from the third communication device; and establish a second communication connection between the first communication device and the second communication device based on the contact information received from the third communication device, wherein the second communication connection is established by way of the first communication device independently initiating communication with the second communication device without any intermediary connection activity performed by the third communication device, wherein the contact information is communicated from the third communication device to the first communication device by way of a message sent from the third communication device to the first communication device.

17. The computer program product of claim 16, wherein the contact information comprises a telephone number for the second communication device.

18. The computer program product of claim 15, wherein the contact information is transferred from the third communication device to the first communication device over short messaging protocol (SMS).

19. The computer program product of claim 15, wherein the contact information is transferred from the third communication device to the first communication device over a text-based communication protocol.

20. The computer program product of claim 15, wherein the third communication device transfers the contact information to the first communication device, in response to determining that transferring the contact information to the first communication device is authorized.

* * * * *